J. L. Hathaway,
Finishing Watch Wheels.
No. 107,903.  Patented Oct. 4, 1870.
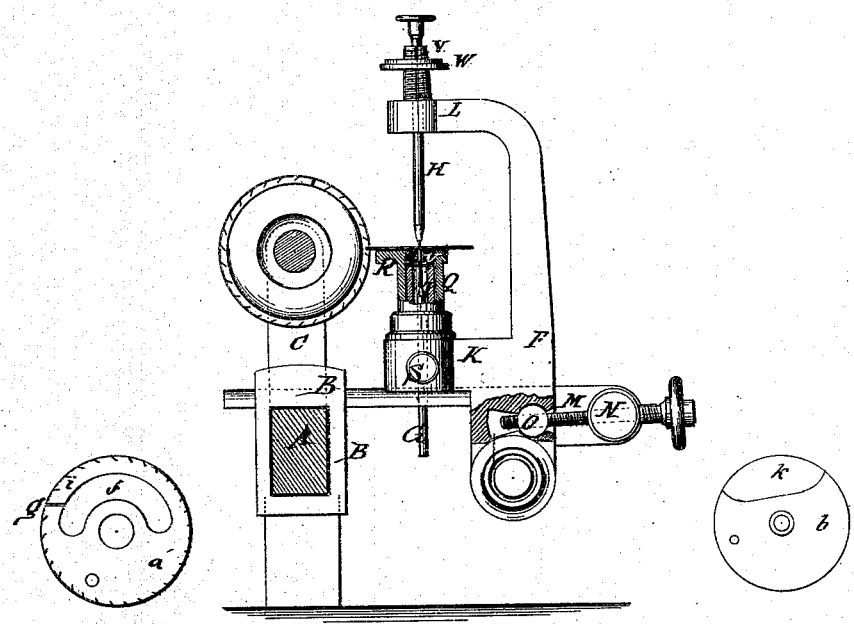
Witnesses:
Inventor:
J. L. Hathaway
per Munn & Co
Attorneys.
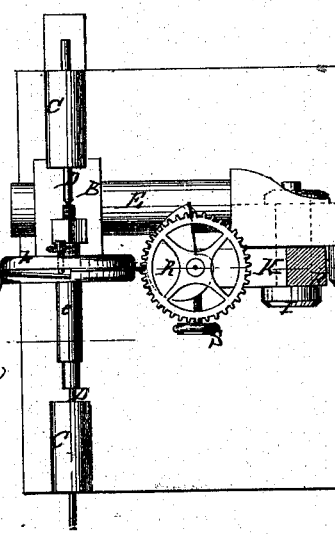

United States Patent Office.

JAMES L. HATHAWAY, OF NORFOLK, VIRGINIA.

Letters Patent No. 107,903, dated October 4, 1870.

IMPROVEMENT IN MACHINES FOR FINISHING WHEELS FOR WATCHES.

The Schedule referred to in these Letters Patent and making part of the same

*To all whom it may concern:*

Be it known that I, JAMES L. HATHAWAY, of Norfolk, in the county of Norfolk and State of Virginia, have invented a new and improved Machine for Finishing Wheels; and I do hereby declare that the following is a full, clear, and exact description thereof, which will enable others skilled in the art to make and use the same, reference being had to the accompanying drawing forming part of this specification.

This invention relates to improvements in machinery for dressing and finishing small gear and other wheels for watches and the like, and consists in a rotary cutter of peculiar construction, and a wheel-support, arranged as hereinafter described, for turning the faces or peripheries of the wheels; also for dressing out and finishing the teeth.

Figure 1 is a sectional elevation of my improved machine;

Figure 2 is a plan view of the same;

Figure 3 is a plan view of the cutter; and

Figure 4 is a face view of one of the collars used for holding and adjusting the cutters.

Similar letters of reference indicate corresponding parts.

A is the beam of an ordinary watchmaker's lathe, and

B a slide placed thereon, between the stocks C, for holding the centers D.

E is another slide, arranged in B in the ordinary way, and to work transversely to it.

F is a support for the vertical centers G H, pivoted to a stud I, projecting from one side of E, near the outer end, and rising vertically from it, so as to hold the said centers by the arms K L, in front of a cutter mounted between the centers D.

M is a feed-screw, swiveled in the stud N at the outer end of E, and on the same side that the stud I is; said screw works through a nut, O, in the support F, and feeds it to or from the cutter.

Both the stud N and nut O are capable of oscillating, as necessary, on account of the movement of the support E around its pivot.

P is a wheel-support mounted on a stud, T, rising up from the arm Q, so as to turn freely, and having an eccentric-shaped top-plate R, which may be used for supporting wheels of different sizes, being turned and adjusted so that the periphery of the wheel to be acted on will project slightly beyond the edge of it in front of the center.

This wheel-support and the stud on which it turns are hollow, and admit the center G to rise up through them; the said center being held by a set-screw, S, at any point.

The hollow stud also admits of the pivots of the wheel extending downward to the center G.

The said stud does not rise quite as high as the top of the wheel-support, leaving a space in the latter for the insertion of small collets, chucks, or collars *v*, as may be required for reception of the hubs of wheels and the like, said collets being removable for the substitution of those having different-sized holes.

The upper center H is held in place by the split screw-threaded tube V and nut W.

The dressing and finishing wheel is composed of the thin rotary cutter, a pair of collars, one of which is shown at *b*, and an adjusting screw, *d*, the said wheel being placed on a mandrel, *e*, fitted to work between the centers of a lathe.

The cutter is made of a thin plate of steel, from which a considerable part is removed at *f*, and a cut, *g*, is made from the space *f* to the periphery, as shown, so that a screw, *d*, screwing through the collar *h*, against the part *i* near the cut *g*, may spring it to one side into a recess, *k*, made in the collar *b*.

This offset in the periphery of the cutter is made for the purpose of turning the wheel on which the cutter acts by the act of cutting the periphery of the wheel.

If it is designed to dress off the whole face of the wheel, the offset of the part *i* is not greater than the thickness of the cutter, so that each time it comes around to the wheel it will begin a new cut by the side of the last one; but for cutting cog-teeth or dressing out those already cut, the offset should be made as great as the pitch of the teeth, so that it will reach as far to the side of the notch last cut as required to enter the next notch; the wheel is then turned the distance of one tooth by the inclined part of the cutter; it then remains in position till the plane part escapes from the notch and the inclined part or offset comes around again.

This arrangement serves the purpose of a feeding or spacing apparatus, and very greatly simplifies the machine.

Any other suitable or equivalent means may be employed for adjusting the cutter.

Having thus described my invention,

I claim as new and desire to secure by Letters Patent—

1. The combination of the slotted and divided cutter *a*, collars *k*, and adjusting-screw *d*, arranged substantially as specified.

2. The combination, with the subject-matter of the first claim, of the wheel-support and centers G H, substantially as specified.

3. The combination of the rotating support Q R and hollow stud, with support K and set-screw S, substantially as shown and described.

4. The combination, with the subject-matter of third claim, of the series of interchangeable collets, substantially as specified.

5. The combination with the supporting-table, of the slide E, support F, feed-screw M, stud N, and nut O, arranged substantially as shown and described, for the purpose specified.

JAS. L. HATHAWAY.

Witnesses:
  JNO. R. HATHAWAY,
  GEORGE WALKER.